United States Patent [19]

Curatolo et al.

[11] 4,429,109
[45] Jan. 31, 1984

[54] POLYAMIDES WITH HIGH GLASS TRANSITION TEMPERATURES PREPARED FROM N,N'-TEREPHTHALOYLDI-BETA-ALANINE AND A DIAMINE

[75] Inventors: Benedict S. Curatolo, Maple Heights; Gerald P. Coffey, Lyndhurst, both of Ohio

[73] Assignee: Standard Oil Company, Cleveland, Ohio

[21] Appl. No.: 418,334

[22] Filed: Sep. 15, 1982

[51] Int. Cl.$^3$ .................... C08G 69/08; C08G 69/26; C08G 69/36
[52] U.S. Cl. .................................. 528/331; 528/310; 528/321; 528/329; 528/330; 528/353
[58] Field of Search ............... 528/331, 310, 329, 353, 528/321, 330

[56] References Cited

U.S. PATENT DOCUMENTS

| | | | |
|---|---|---|---|
| 2,252,555 | 8/1941 | Carothers | 528/329 |
| 2,356,702 | 8/1944 | Schlack | 528/329 |
| 2,500,317 | 3/1950 | Lincoln | 528/329 |
| 2,672,480 | 3/1954 | Matlack | 260/534 |
| 2,749,331 | 6/1956 | Breslow | 260/89.7 |
| 3,046,260 | 7/1962 | Steward et al. | 260/80.5 |
| 4,283,524 | 8/1981 | Greene | 528/363 |

*Primary Examiner*—Harold D. Anderson
*Attorney, Agent, or Firm*—David P. Yusko; John E. Miller, Jr.; Larry W. Evans

[57] ABSTRACT

Polyamides containing as much as 50 mole percent nylon-3 units in at least a partially alternating system and exhibiting high glass transition temperatures (Tg) can be prepared from N,N'-terephthaloyldi-beta-alanine and a diamine, such as bis(p-aminocyclohexyl)methane. Properties of such polyamides can be controlled by choice of the diamine and the preparation temperature without loss of the high Tg. The polyamides of this invention exhibit utility in comfort fiber applications.

7 Claims, No Drawings

POLYAMIDES WITH HIGH GLASS TRANSITION TEMPERATURES PREPARED FROM N,N'-TEREPHTHALOYLDI-BETA-ALANINE AND A DIAMINE

BACKGROUND OF THE INVENTION

1. Field of the Invention

The invention relates to novel polymers containing amide linkages and to a process for preparing such polymers. More specifically this invention relates to polyamides containing nylon-3 units and having a high glass transition temperature. These polyamides are prepared by condensation polymerization from N,N-terephthaloyldi-beta-alanine and a diamine.

2. Description of the Prior Art

Nylon is a generic term for synthetic polyamides. The present invention pertains to nylon-3/X polymers, which contain a nylon-3 unit. This form of shorthand is used to identify the number of carbon atoms in the respective monomers which make up the polyamide. Nylon-3 is a polyamide comprised of 3 carbon units. Nylon-3/X is a copolyamide which contains groups of 3 carbon units along with any nylon fragment of the general formula:

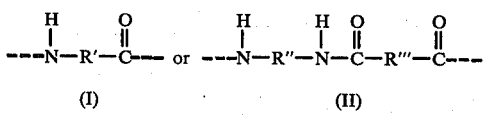

where R', R" and R'" are any aliphatic, alicyclic, or aromatic carbon group.

There are several known methods for producing nylon-3 type polymers using starting materials different from those of the present invention. Most polyamides are produced by a condensation polymerization process. In other words, the polymerization occurs primarily by the reaction between pairs of functional groups, with water split out. For example, the thermal condensation of beta-alanine proceeds as follows:

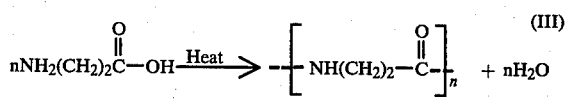

where n is the number of monomer units reacted.

Nylon-3 polymers are also prepared by hydrogen transfer polymerization of acrylamide in the presence of a basic catalyst (U.S. Pat. No. 2,749,331), by processes employing beta-lactam and a ring-opening polymerization (U.S. Pat. No. 3,220,983), by condensation hydrolysis of beta aminopropionitrile (U.S. Pat. No. 3,499,874), by condensation hydrolysis of oxydipropionitrile (Japan No. 68 27,617), and by the thermal polymerization of ethylene cyanohydrin (U.S. Pat. No. 3,125,353).

Numerous combinations of diacids, diamines and amino acids have been interacted by the above methods and copolymers containing various proportions of two or more diacids, diamines or amino acids have been prepared.

The present invention pertains to nylon-3/X copolymers. These copolymers are formed by the polymerization processes described above from a monomer containing nylon-3 units combining with other suitable monomers. Most nylon-3/X copolymers are random systems which exhibit a melting point depression with increasing comonomer, i.e. X, concentration up to approximately 50 mole %. These random systems also exhibit decreased crystallinity and increased water absorption.

A typical nylon-3/X copolymer has a low glass transition temperature (Tg) of less than 70° C. The glass transition temperature is the temperature at which an amorphous material changes from a brittle, vitreous state to a plastic state. A polymer or copolymer with a high Tg is suitable for high temperature structural applications. Consequently most nylon-3/X copolymers which have been produced are unsuitable for high temperature structural use.

SUMMARY OF INVENTION

Polyamides containing as much as 50 mole % nylon-3 units in at least a partially alternating system and exhibiting high glass transition temperatures (Tg) are prepared by thermal condensation polymerization of a nylon salt made from N,N'-terephthaloyldi-beta-alanine and a diamine. Also, different polyamides are produced from the same nylon salt by altering the temperature of the polymerization process. The polyamides produced at different temperatures vary in structure and crystallinity but still maintain a high Tg.

DETAILED DESCRIPTION OF THE INVENTION

The Monomers:

N,N'-terephthaloyldi-beta-alanine (NTBA) contains a nylon-3 moiety. It is a difunctional carboxylic acid and has the following structure:

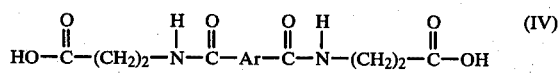

where Ar is an aromatic radical. NTBA can be synthesized by the reaction of terephthaloyl chloride and beta-alanine in dilute NaOH.

Suitable diamines are of the following formula:

$$H_2N-R-NH_2 \qquad (V)$$

where R is any aliphatic, alicyclic or aromatic divalent radical. Preferably R is a one or two ring alicyclic divalent radical of 6 to 13 carbon atoms. For example R may be one of:

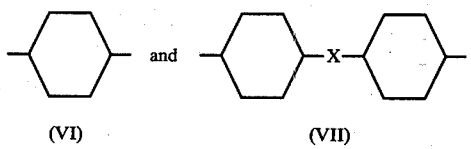

where X is one of $CH_2$, S, O and $SO_2$. Where R is of formula VII, preferably X is $CH_2$ and the preferred diamine is bis(p-aminocyclohexyl)methane. The diamines suitable for this invention are commercially available.

Alicyclic diamines are preferred for this invention. The alicyclic monomer contributes chain flexibility for good processability to the resulting polyamide without significantly lowering the Tg of the polyamide. In comparison, the use of aliphatic and aromatic diamines will result in polymers with high Tg's but their processability is less facile due to higher melting points.

The Polyamide:

NTBA and a diamine will react facilely and noncatalytically in a dipolar solvent to form a nylon salt of the formula:

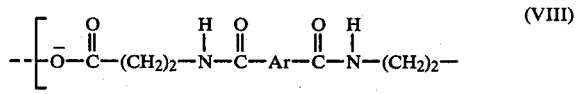

(VIII)

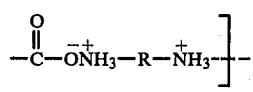

The above nylon salt forms as a very thick white precipitate which must be recovered (usually filtered) from the solvent and then dried. The choice of dipolar solvent is not critical to this invention. Suitable dipolar solvents which may be used in this invention include N-methyl pyrrolidone, dimethyl acetamide, dimethyl formamide, dimethyl sulfoxide and hexamethyl phosphoramide. The preferred dipolar solvent is dimethyl acetamide.

When the nylon salt of N,N'-terephthaloyldi-beta-alanine and the diamine (subsequently termed "the nylon salt") is heated at a temperature above its melting point, the nylon salt undergoes condensation polymerization, water is split out from reacting pairs of functional groups and a water insoluble polyamide with a high Tg is produced. The melting temperature of the nylon salt varies with the choice of diamine. A preferred nylon salt of the invention derived from NTBA and bis(p-aminocyclohexyl)methane, has a melting temperature of approximately 245° C. The longer the nylon salt is heated, the more water is split out and the more complete is the polymerization. Typically, the nylon salt is heated for a time sufficient to insure maximum polymerization.

The structure of the polyamide is dependent, at least in part, upon the condensation polymerization temperature. Any temperature above the melting point of the nylon salt will cause it to undergo condensation polymerization. When the nylon salt is heated at a temperature just above its melting point, typically within approximately 5° C. above the melting point, the resulting polyamide is comprised of the following structural unit:

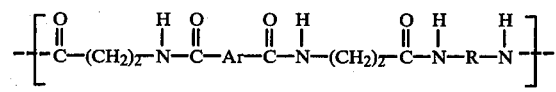

(IX)

As the polymerization temperature is increased, some of the beta-alanine units of the formula:

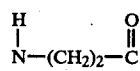

(X)

are eliminated from the polymer of formula IX and a random polymer consisting of the following two structural units in random sequence is produced:

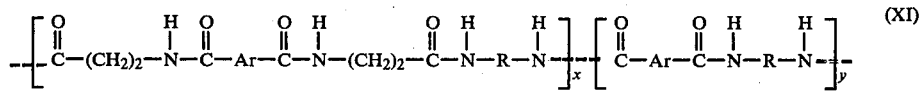

(XI)

where x and y are the mole percentage of each structural unit in the total polymer. As the polymerization temperature increases from just above the melting point of the nylon salt, x will decrease and y will increase. Preferably X is greater than 0. More preferably, X is greater than 50%. A polyamide with a structure where x=0 and y=100 is possible. However, such a polyamide is not preferred since it contains no nylon-3 units.

Infrared spectroscopy and nuclear magnetic resonance spectroscopy have indicated the elimination of both beta-alanine units at high polymerization temperatures from the polymer of formula IX. However, theoretically the following structures can also be formed by high polymerization temperatures which result in the elimination of just one of the beta-alanine units of formula IX:

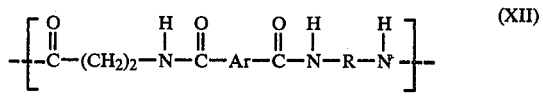

(XII)

or

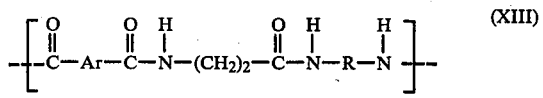

(XIII)

The elimination of beta-alanine units from the nylon salt during the polymerization process, results in a polyamide with a higher melting point and a lower crystallinity than polyamides formed in a process where no such elimination occurs. As more beta-alanine units are eliminated, the more the melting point increases and the crystallinity decreases consequently a polyamide of the structural units shown in formula XI exhibits a higher melting point and lower crystallinity than a polyamide comprised of the repeating single unit structure shown in formula IX. Typically, polyamides where the beta-alanine units have been eliminated also tend to be transparent.

The degree to which beta-alanine units are eliminated during the polymerization of the nylon salt is dependent upon the polymerization temperature. Consequently, the choice of polymerization temperature, as well as the choice of diamine, is a means for tailoring the finished product. A polymerization temperature just above the melting point of the nylon salt, yields a completely alternating polyamide with good crystallinity, but poor transparency. Higher polymerization temperatures yield more transparent partially randomized polyamides with decreasing crystallinity.

For purposes of this invention, a high Tg is a glass transition temperature greater than 130° C. The Tg of the polyamide will vary based upon the choice of diamine, the polymerization temperature and the structure of the resulting polyamide. Typically the Tg of polyamides produced from the nylon salt of NTBA and bis(p-aminocyclohexyl)methane, polymerized at a temperature between 250° C. and 300° C. are between approximately 170° C. to 185° C.

The exact molecular weight of the polyamide formed from NTBA and a diamine will vary. However, these polymers are generally of sufficient molecular weight to render them water insoluble by Soxhlet extraction.

Since NTBA is a difunctional carboxylic acid, it does not undergo homopolymerization. The copolymers produced from NTBA and a diamine have no repeating nylon-3 units but still contain up to 50 mole percent nylon-3 units in at least a partially alternating system with little or no interruption of crystal structure. These copolymers exhibit greater thermal stability, as is evidenced by the high Tgs, and greater water insolubility stirred vigorously. The nylon salt was filtered from the solution and washed with DMAC.

The nylon salt (4.12 grams) was weighed into a round bottom boiling flask and then placed into a sealed cage. The cage was placed into an oil bath at 250° C. After 1½ hours in the bath, a high vacuum (0.01–0.07 mm Hg) was applied to the cage while the cage remained in the oil bath for an additional hour.

After 2½ hours at 250° C., 3.64 grams of a light tan opaque solid were produced. This solid was determined to be greater than 97% water insoluble after 16 hours of Soxhlet extraction. IR and NMR spectrocopy revealed the polymer contained the following repeating structural unit:

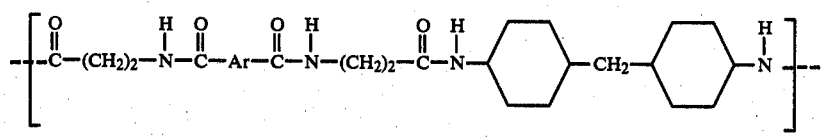

than previously produced random copolymers. As a consequence, use of the copolymers of this invention may be preferable to random copolymers in applications where water uptake is undesirable. Previously produced random nylon-3/X copolymers have high water sensitivity e.g. highly hydrophilic. Polymers formed from the reaction of N,N'-terephthaloyldi-beta-alanine with diamines are expected not to have this water sensitivity characteristic due to the hydrophobic aromatic ring in the diacid. The nylon-3 units in these polymers, however, still allow for some moisture uptake which may be desirable in some applications.

Polyamides produced from NTBA and a diamine are anticipated to exhibit excellent utility in comfort fiber applications because of their strength and limited water uptake as well as high temperature structural applications because of their high Tg.

SPECIFIC EMBODIMENTS

In order to provide a better understanding of the present invention, the following working examples are presented.

Each of the polymers produced in the following examples was subjected to infrared spectroscopy and nuclear magnetic resonance spectroscopy to determine structure. Intrinsic viscosities were determined for the polyamides by weighing a polymer sample and then dissolving the sample in 90% formic acid (Baker Polymerization Characterization Solvent) at room temperature to make a solution containing about 1 g/100 ml. Viscosity was measured via a Cannon-Ubbelhode dilution viscometer mounted in a constant temperature bath and maintained at 25° C.

Example 1

N,N'-Terephthaloyldi-beta-alanine (3.08 grams) was dissolved in 40 grams of dimethylacetamide (DMAC) and 2.10 grams of bis(p-aminocyclohexyl)methane were added dropwise to the solution. The nylon salt formed as a very thick white precipitate when the solution was Additional tests revealed this polyamide to have a Tg of 180° C., a melting point of 320° C., crystallinity of 27% and an intrinsic viscosity of 0.17 (25° C., 90% Formic acid).

Example 2

N,N'-Terephthaloyldi-beta-alanine (9.24 grams) was dissolved in 120 grams of dimethylacetamide and 6.30 grams of bis(p-aminocyclohexyl)methane were added dropwise to the solution. The nylon salt formed as a very thick white precipitate when the solution was stirred vigorously. The nylon salt was filtered from the solution and washed with DMAC.

7.05 grams of the nylon salt were weighed into a round bottom boiling flask and then placed into a sealed cage. The cage was placed into an oil bath at 285° C. After 2¼ hours in the bath, a high vacuum (less than 0.01 mm Hg) was applied to the cage while the cage remained in the oil bath for an additional ¼ hour at 290° C.

After 2¼ hours at 285° C. and ¼ hours at 290° C. a light orange transparent solid was produced. This solid was determined to be greater than 97% water insoluble after 16 hours of Soxhlet extraction. IR and NMR spectroscopy revealed two structural units present in different proportions. The spectroscopy reports indicate the following structure:

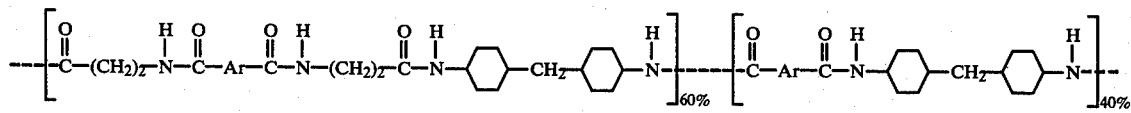

where 60% and 40% refer to the percentage of each structural unit in the polyamide. Additional tests revealed this polyamide to have a Tg of 175° C., a melting point greater than 340° C., crystallinity of less than 3% and an intrinsic viscosity equal to 0.16 (25° C., 90% Formic acid).

Although the invention has been described in considerable detail in Examples 1 and 2, these examples are for the purposes of illustration only and it is understood that variations and modifications can be made by one skilled in the art without departing from the spirit and scope of the invention.

The claimed invention is:

1. A water insoluble polyamide containing zero to about 50 mole % nylon-3 units in at least a partially alternating structure, exhibiting glass transition temperatures greater than 130° C. and derived by condensation polymerization of a nylon salt of the formula:

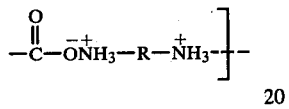
(VIII)

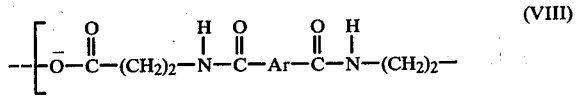

where R is any aliphatic, aromatic or alicyclic divalent radical.

2. The polyamide of claim 1, having the following general formula:

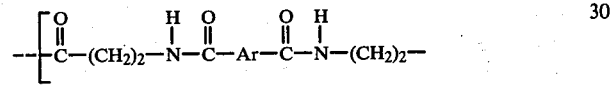

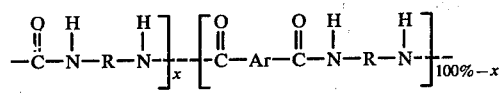

where x is the percentage of the first structural unit in the polyamide and x is greater than zero.

3. The polyamide of claim 2 where X is greater than 50%.

4. The polyamide of claims 1 or 2 where R is a one or two ring alicyclic divalent radical of 6 to 13 carbon atoms.

5. The polyamide of claim 4 where R is one of a cyclohexyl radical or a radical of the formula:

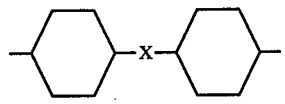

where X is one of $CH_2$, S, O, or $SO_2$.

6. The polyamide of claim 5 where R has the following structure:

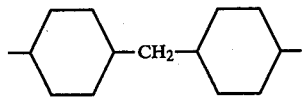

7. An article or fabric comprising the polymer of claim 1.

* * * * *